April 3, 1928.
J. C. DIEHL
1,664,596
METHOD OF CONTROLLING THE FLOW OF FLUIDS IN
CONNECTED CONDUITS AND DEVICE THEREFOR
Filed Jan. 4, 1924
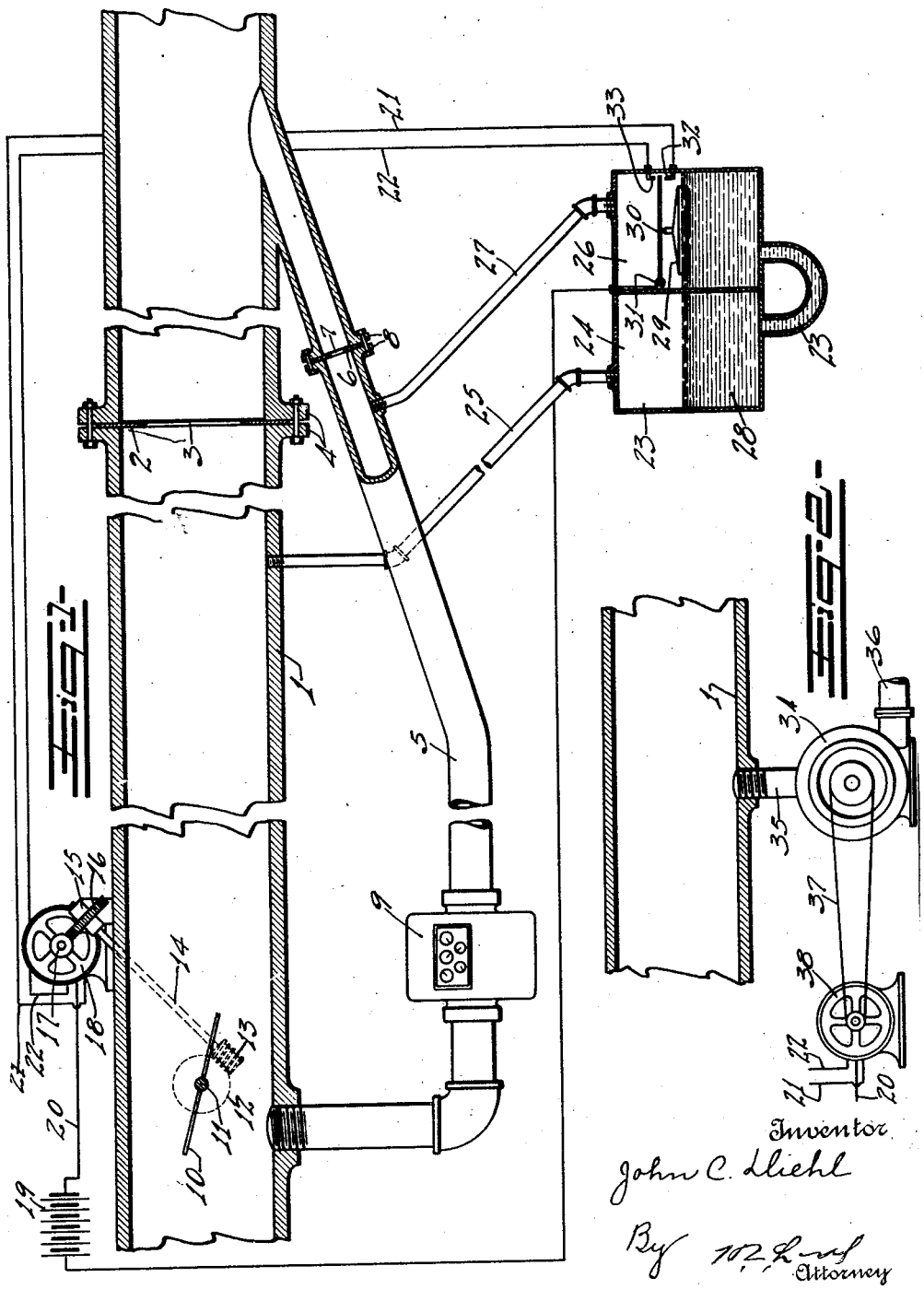
Inventor
John C. Diehl
By
Attorney Patented Apr. 3, 1928.

1,664,596

UNITED STATES PATENT OFFICE.

JOHN C. DIEHL, OF ERIE, PENNSYLVANIA.

METHOD OF CONTROLLING THE FLOW OF FLUIDS IN CONNECTED CONDUITS AND DEVICE THEREFOR.

Application filed January 4, 1924. Serial No. 684,313.

The invention is particularly advantageous in controlling the relative flow of fluids through two conduits one of which has a comparatively small bypass in order that a measurement of the fluid flowing through the bypass may be used in determining the total flow of fluid and I have exemplified my invention in this relation.

Fluids generally have heretofore been measured by displacement meters, proportional meters and orifice meters but these have been subject to their peculiar disadvantages. The displacement meters while accurate are very expensive and often impractical for large volumes especially with fluid at high pressure. Proportional meters are more or less inaccurate especially at low rates of flow due to frictional and proportional disturbances. The measurement by orifice meters involves extended calculations for changes of differential (differences of pressure extending across the disc) and changes in gravity and these are disturbed by variations in initial pressure and temperature and its commercial capacity range has a limited minimum and maximum ratio.

In carrying out my invention I distribute the flow through the main conduit and a bypass and by special devices compel a definite proportion of the fluid to traverse the bypass and measure with a small accurate meter the controlled fluid flowing through the bypass. In the particular embodiment shown, this is accomplished by supplying each conduit with calibrated orifices of definite relation and maintaining the pressures in both conduits at the inlet and outlet sides of the orifices respectively equal. Further details and features of the invention will appear from the specification and claims.

The devices of the invention and by which the method may be practiced are illustrated in the accompanying drawings as follows:—

Fig. 1 shows a sectional view of the apparatus.

Fig. 2 shows an alternative construction.

1 marks the main conduit, 2 an orifice disc in the main conduit having the orifice 3, 4 flanges in the main conduit in which the disc is secured, 5 a bypass, and 6 the orifice disc having an orifice 7 arranged in the bypass and secured between the flanges 8 in the usual manner.

A small and accurate meter 9 of any desired type is placed in the bypass.

A butterfly valve 10 is mounted on a shaft 11 extending across the main conduit and a worm wheel 12 is mounted on the shaft. A worm 13 operates on the wheel. The worm is mounted on a shaft 14 carried by bearings 15. A worm gear 16 meshes with a worm 17. The worm 17 is driven from a reversing electric motor 18. A battery 19 is arranged to drive the motor 18, a line 20 extending from the motor and including the battery in its circuit and lines 21 and 22 leading to the other side of the motor also leading into the motor and being adapted to reverse the motor as one or the other of the lines is closed with the line 20.

A U-tube 23 has one end 24 connected by a pipe 25 with the main conduit 1 at the inlet side of the orifice. The opposite side 26 of the U-tube is connected by a pipe 27 with the bypass 5 at the inlet side of the orifice. The two sides of the U-tube, therefore, are subjected at all times to the pressures of the conduits. A liquid seal 28 is arranged in the U-tube. A float 29 is arranged at one side of the U-tube and operates against a switch lever 30, the lever being mounted in a hinge bracket 31 secured to the tube. Switch terminals 32 and 33 are arranged at each side of the neutral point of the lever 30 and these terminals are connected with the lines 21 and 22.

With the liquid seal exactly level in the two ends of the U-tube the lever 30 finds a neutral position between the terminals 32 and 33. With any variation in level, however, of the liquid seal the switch lever contacts one or the other of the terminals and closes the circuit through the motor starting the motor. When the liquid in the side 26 falls thus indicating an excess of pressure in the bypass the motor is driven in a direction to open the valve 10. When the liquid in the side 26 rises due to an excess of pressure in the main line the switch lever 30 contacts the terminal 33 and the motor rotates to close the valve 10. In this way regardless of frictional or disturbing losses in the bypass or conduit up to the orifice the valve is so operated as to neutralize these disturbances and maintain a fixed relation in the two lines and consequently a definite relation of flow so that the readings of the meter 9 may be computed, or may, in the meter itself, compute the total flow of fluid.

While I have shown the devices as being controlled by the pressures at the inlet side of the orifices I do not wish to be limited in the broader aspects of my invention to such an application, nor do I wish to be limited to a means which operates on the main conduit as controlling the proportionate flow through the two conduits.

In Fig. 2 I have shown an alternative form in which the flow through the bypass may be accelerated by a pump 34 which has an inlet 35 and discharge 36 forming the bypass. The pump is driven by a belt 37 extending to a motor 38 and the motor 38 is controlled through the lines 21—22—20 in the same manner as the construction shown in Fig. 1.

What I claim as new is:—

1. In a fluid flow controlling device, the combination of two connected conduits; pressure sensitive means connected with said conduits comprising a U-tube having one end connected to one conduit and the other to the other conduit; and mechanism controlled by pressures registered in the U-tube for maintaining a constant pressure relation in said conduits.

2. In a fluid flow controlling device, the combination of two connected conduits having a single source of fluid supply; a power driven mechanism controlling the relative flow of fluid through said conduits; and means responsive to relative flow conditions in said conduits controlling said power mechanism to maintain a definite flow relation between said conduits.

3. In a fluid flow controlling device, the combination of two connected conduits having a single source of fluid supply; a valve in one of the conduits; a power mechanism controlling the valve; a relative pressure sensitive device responding to the pressure conditions in said conduits, the response being to pressure conditions in the valve conduit at the discharge side of the valve; and means controlled by the pressure sensitive device controlling said mechanism.

4. In a fluid flow controlling device, the combination of two connected conduits having a single source of fluid supply; an electrically driven mechanism controlling the relative flow of fluid through said conduits; and means responsive to relative flow conditions in said conduits controlling said electric mechanism to maintain a definite pressure relation between the fluids in said conduits.

5. In a fluid flow controlling device, the combination of two connected conduits having a single source of fluid supply; a valve in one of the conduits; an electric motor actuating the valve; a pressure sensitive device responding to relative pressure conditions in both conduits the response being to pressure conditions in the valve conduit at the discharge side of the valve; and means controlled by the pressure sensitive device controlling the electric motor.

6. In a fluid flow controlling device, the combination of a main conduit and a bypass branching from and leading to the main conduit, said conduit and bypass having constrictions therein forming orifices of definite relation; pressure sensitive devices connected with said conduit and bypass adjacent to the orifices; mechanism controlled by said pressure sensitive devices maintaining a constant relative relation between the pressures at corresponding sides of the orifices; and a meter in the bypass.

7. In a fluid flow controlling device, the combination of a main conduit and a bypass branching from and leading to the main conduit, said conduit and bypass having constrictions therein forming orifices of definite relation; a meter in the bypass; power driven mechanism controlling the relative pressure at the corresponding sides of the orifices to maintain a constant relation between the flows through the conduit and the bypass; and pressure sensitive mechanism responsive to pressure conditions in said conduits controlling said mechanism.

8. In a fluid flow controlling device, the combination of two conduits branching from a common source and having constrictions therein forming orices of definite relation, and means automatically responsive to relative pressure changes at corresponding sides of the orifices to maintain an equal pressure and consequent definitely related flow through the orifices.

In testimony whereof I have hereunto set my hand.

JOHN C. DIEHL.